United States Patent
Koker et al.

(10) Patent No.: US 9,678,795 B2
(45) Date of Patent: Jun. 13, 2017

(54) DIRECT RING 3 SUBMISSION OF PROCESSING JOBS TO ADJUNCT PROCESSORS

(75) Inventors: Altug Koker, El Dorado Hills, CA (US); Aditya Navale, Folsom, CA (US); Balaji Vembu, Folsom, CA (US); Murali Ramadoss, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 13/993,089

(22) PCT Filed: Dec. 30, 2011

(86) PCT No.: PCT/US2011/068032
§ 371 (c)(1),
(2), (4) Date: Jun. 11, 2013

(87) PCT Pub. No.: WO2013/101155
PCT Pub. Date: Jul. 4, 2013

(65) Prior Publication Data
US 2014/0068626 A1     Mar. 6, 2014

(51) Int. Cl.
| *G06F 9/46* | (2006.01) |
| *G06F 9/50* | (2006.01) |
| *G06F 9/48* | (2006.01) |
| *G06F 15/167* | (2006.01) |
| *G06F 9/54* | (2006.01) |
| *G06F 12/14* | (2006.01) |

(52) U.S. Cl.
CPC ............. *G06F 9/50* (2013.01); *G06F 9/4812* (2013.01); *G06F 9/545* (2013.01); *G06F 12/1491* (2013.01); *G06F 15/167* (2013.01)

(58) Field of Classification Search
CPC .......... G06F 9/50; G06F 9/4812; G06F 9/545; G06F 12/1491; G06F 15/167
See application file for complete search history.

(56) References Cited

U.S. PATENT DOCUMENTS

| 4,660,144 | A | * | 4/1987 | Walsh ............................. 718/1 |
| 4,703,417 | A | * | 10/1987 | Morganti ............ G06F 12/1491 |
| | | | | 711/E12.097 |
| 5,303,378 | A | | 4/1994 | Cohen |
| 6,012,129 | A | * | 1/2000 | Hartner et al. ............... 711/170 |
| 6,629,175 | B1 | | 9/2003 | Manning |
| 7,103,888 | B1 | | 9/2006 | Cayton et al. |
| 7,228,550 | B1 | | 6/2007 | Eberhard et al. |
| 7,768,518 | B2 | | 8/2010 | Collins |
| 2002/0152327 | A1 | | 10/2002 | Kagan |
| 2006/0136874 | A1 | | 6/2006 | Berry |
| 2006/0288125 | A1 | | 12/2006 | Boyd |

(Continued)

OTHER PUBLICATIONS

PCT International Search Report and Written Opinion issued in corresponding PCT/US2011/068032 dated Jun. 15, 2012, (10 pages).

(Continued)

*Primary Examiner* — Camquy Truong
(74) *Attorney, Agent, or Firm* — Trop Pruner & Hu, P.C.

(57) ABSTRACT

Transitions to ring 0, each time an application wants to use an adjunct processor, are avoided, saving central processor operating cycles and improving efficiency. Instead, initially each application is registered and setup to use adjunct processor resources in ring 3.

24 Claims, 5 Drawing Sheets

(56) References Cited

U.S. PATENT DOCUMENTS

| | | | |
|---|---|---|---|
| 2008/0148032 A1 | 6/2008 | Freimuth | |
| 2010/0205379 A1 | 8/2010 | Auernhammer | |
| 2012/0254982 A1* | 10/2012 | Sallam ................ | G06F 21/566 726/16 |
| 2013/0097355 A1* | 4/2013 | Dang et al. ...................... | 711/6 |

OTHER PUBLICATIONS

CN office action issued in corresponding CN patent application No. 201180076161.3 (7 pages), [no English translation].

EP office action issued in corresponding EP patent application No. 11878425 dated Jan. 16, 2017 (6 pages).

EP supplementary search report issued in corresponding EP patent application No. 11878425 dated Sep. 10, 2015 (11 pages).

Druschel, P., et al., "Experiences with a high-speed network adaptor," Proceedings of the Conference on Communications Architectures, Protocols and Applications, SIGCOMM '94, Jan. 1, 1994 (19 pages).

Anonymous, "Protection ring"—Wikipedia, https://en.wikipedia.org/wiki/Protection_ring (7 pages).

Anonymous, "System Call"—Wikipedia, https://en.wikipedia.org/wiki/System_call (6 pages).

* cited by examiner

DIRECT RING 3 SUBMISSION OF PROCESSING JOBS TO ADJUNCT PROCESSORS

BACKGROUND

This relates generally to computers and particularly to computer systems that include adjunct processors.

As used herein, an adjunct processor is anything, other than a central processing unit, used in conjunction with a central processing unit but attached to the system as a peripheral. Examples of adjunct processors include graphics processors, network interface cards and adapters, and Universal Serial Bus adapters, to mention a few examples.

Commonly, only a ring 0 software driver can submit a task to an adjunct processor by programming the memory mapped registers on the device. So when an application running on a system wants to assign a task to an adjunct processor, it must initiate a switch from ring 3 to ring 0 and then back again. These ring 0 to ring 3 transitions are expensive in terms of processor cycles.

BRIEF DESCRIPTION OF THE DRAWING

Some embodiments are described with respect to the following figures.

DETAILED DESCRIPTION

In accordance with some embodiments, transitions to ring 0, each time an application wants to use an adjunct processor, are avoided, saving central processor operating cycles and improving efficiency. Instead, initially each application is registered and setup to use adjunct processor resources in ring 3.

Figure 1:
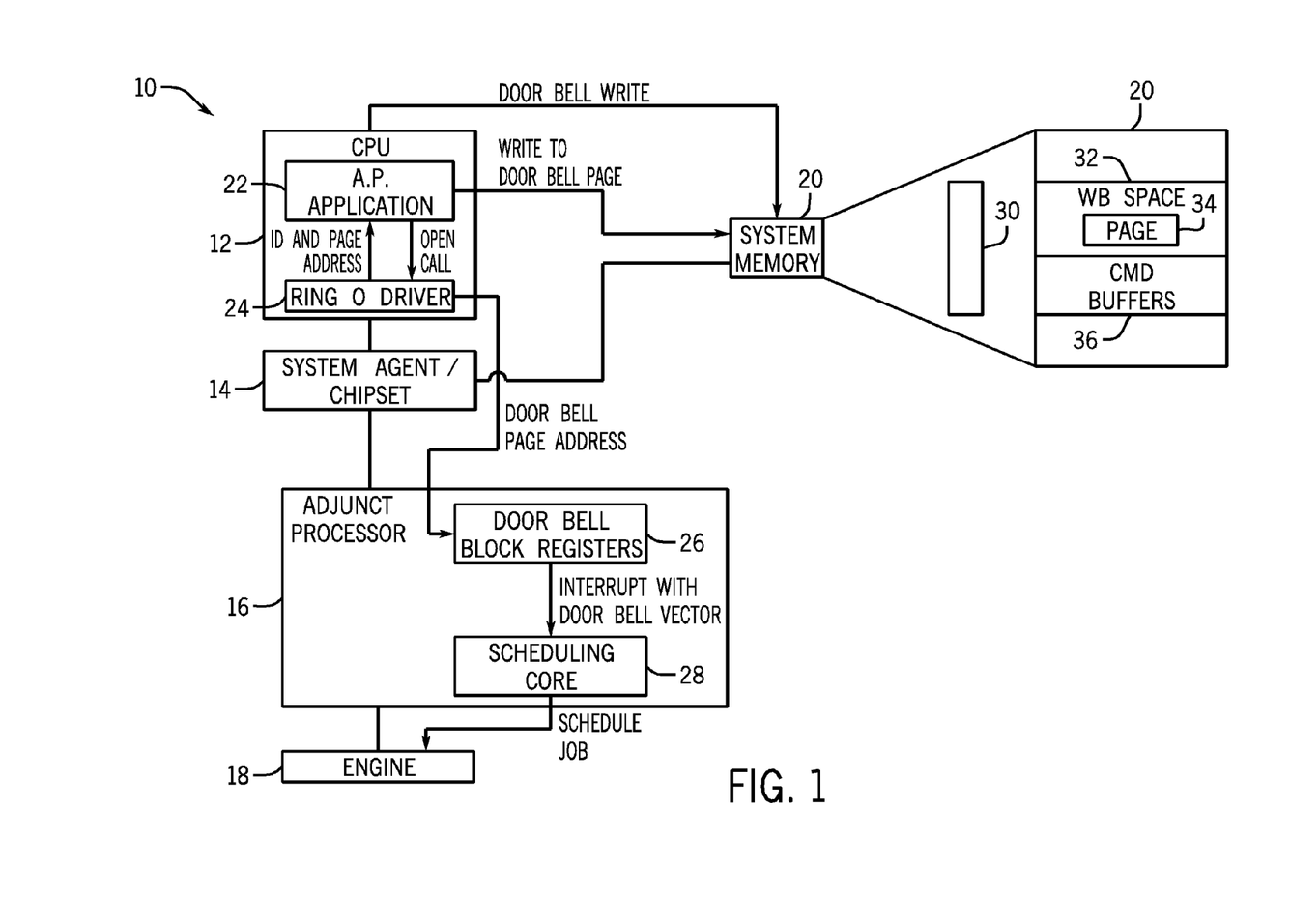
FIG. 1 is a schematic depiction of one embodiment of the present invention.

FIG. 1 shows a typical computer system architecture adapted according to one embodiment of the present invention. The system 10 includes a central processing unit (CPU) 12. While a single central processing unit is shown, multi-core processing units may also be used. The central processing unit is coupled to a system agent or chipset 14. A ring 0 driver 24 executes on the central processing unit 12.

The system agent or chipset is connected to a system memory 20 which typically is a dynamic random access memory (DRAM). An application 22, that may wish to use an adjunct processor resource, may be stored at least temporarily in the system memory 20. The system memory 20 may include a virtual address space 20 addressable through an aperture 30 that does not enable access to an entire addressable virtual space. Also contained in the virtual address space 20 may be command buffers 36.

The virtual space may include a write back space 32 including a doorbell page 34. The doorbell page 34 may be addressed in order to indicate when an application wants to use an adjunct processor resource. This page may be monitored by hardware and when something is written to the page by ring 3 application, the adjunct processor resource is made available to an application program that has preregistered to use that resource without transitioning (again) to ring 0. The same mechanism can also be used by a ring 0 driver for using an adjunct processor resource.

Also coupled to the system agent or chipset 14 is an adjunct processor 16. Again an adjunct processor is any other processor connected as a peripheral to a system including a central processing unit. Examples of frequently used adjunct processors include graphics processor units, network interface cards and adapters, and Universal Serial Bus cards and adapters, to mention some examples. An adjunct processor may be comprised by multiple engines that can be invoked to perform specific tasks. Examples of adjunct processor engines include rendering engine, video decoding engine, video encoding engine, copy engine, etc.

The adjunct processor 16 includes doorbell block registers 26. The doorbell block registers monitor the doorbell page 34 in virtual memory 20 to determine when the page has been written to. When the page has been written to, the doorbell block registers consider that the doorbell has been "rung" and this means that an application program wishes to use an adjunct processor resource. An example of an adjunct processor resource, in the case of an adjunct processor 16 that is a graphics processing unit, is a particular graphics processing engine 18.

The doorbell block registers 26 signal a scheduling core 28, via an interrupt with a doorbell vector, when a doorbell page write is detected. The scheduling core 28 is responsible for scheduling operations of the adjunct processor 16. The scheduling core 28 then schedules the job needed by the application 22 in the engine 18.

Thus in some embodiments, two phases are involved. In a first phase, in ring 0, the application program effectively registers with the system agent or chipset 14 to set up a mechanism that, thereafter, can be accessed in ring 3. Thereafter, the application can use resources of the adjunct processor without necessitating a transition from ring 3 to ring 0 operation and back again. This saves processing cycles and improves efficiency in some embodiments. The adjunct processor may provide multiple instances of such doorbell registers to allow multiple applications to submit tasks to it.

Initially, the application expresses its intent to use the adjunct processor resource by performing an open adjunct processor call. This open processor call may be issued by the application in ring 3 and is transmitted to a ring 0 driver 24 via a user mode driver, and a run time driver, in some embodiments.

The ring 0 driver 24 creates a context identifier in a process address space. This identifier is then provided back to the application 22. The process address space is an existing space in some embodiments that identifies what process is currently being worked on.

Then the ring 0 driver picks a page out of a set of pre-allocated pages to assign to an application. In one embodiment 256 pages may be available. In some cases the pages may be accessed in virtual address space 20 through an aperture 30.

The adjunct processor page is then mapped into the process address space. This means that the page 34 is mapped into the process address space. The address of this page, called the doorbell page, is provided by the ring 0 driver 24 to the doorbell block registers 26 in the adjunct processor 16. This sets the doorbell block registers 26 up to monitor the page 34. Then when the application writes to the doorbell line of the page, the doorbell block registers 26 monitor is triggered. The registers 26 send a doorbell rung message to the scheduling core 28 on the first doorbell ring resulting from a write to the page 34. The doorbell block registers store a vector of doorbells that were rung.

In one embodiment each doorbell block has 256 vectors that correspond to the 256 pre-allocated pages in virtual memory space 20. If any doorbell was rung (because any page was written to), the doorbell block registers generate an interrupt into the scheduling core 28 indicating that something has happened and that the scheduling core needs to find out what that is.

The scheduling core then reads the 256 doorbell vectors to see which doorbell was rung. The doorbell block registers 26 get a snapshot, in some embodiments, of all doorbells that were rung between the last message and the current doorbell status check. Once the read is done, the doorbell block registers can clear any doorbell vectors and wait for the next ring.

The scheduling core then inspects all the doorbell identifiers. Next the scheduling core uses the page address obtained as described above in order to obtain the queue contents. The scheduling core updates the engine run list with the new job that has been requested by the application.

As a result, after the initial setup phase, an application can cause workloads in an engine 18 to be handled without needing switch to ring 0 again. Any number of subsequent jobs may be handled for the application, but the application only has to access ring 0 one single time.

In general, an application initiates the operation described herein by registering itself as an application that may need to use an adjunct processor. In effect, the application is indicating that it will be submitting work in the future and that it needs an identifier and a doorbell page, to indicate any engines that may be used in the future. The application sets up all the necessary structures to use the engine by itself. All that is needed by the ring 0 driver 24 is the application's address space and command buffers 36 in some embodiments.

All the necessary information then gets transferred by the ring 0 driver into the system agent or chipset 14. The ring 0 driver registers and then lets the scheduling core know that there is an application that has been registered by assigning it an identifier. The ring 0 driver also can provide a doorbell-to-command queue mapping by providing such a table to the scheduling core. The driver 24 then gets out of the way and, thereafter, anytime the application submits work to the central processing unit, the central processing unit writes to a pre-allocated location (where the command buffers are) and writes to the doorbell. Then the central processing unit work is done and the adjunct processor can go about executing the job.

Figure 2:
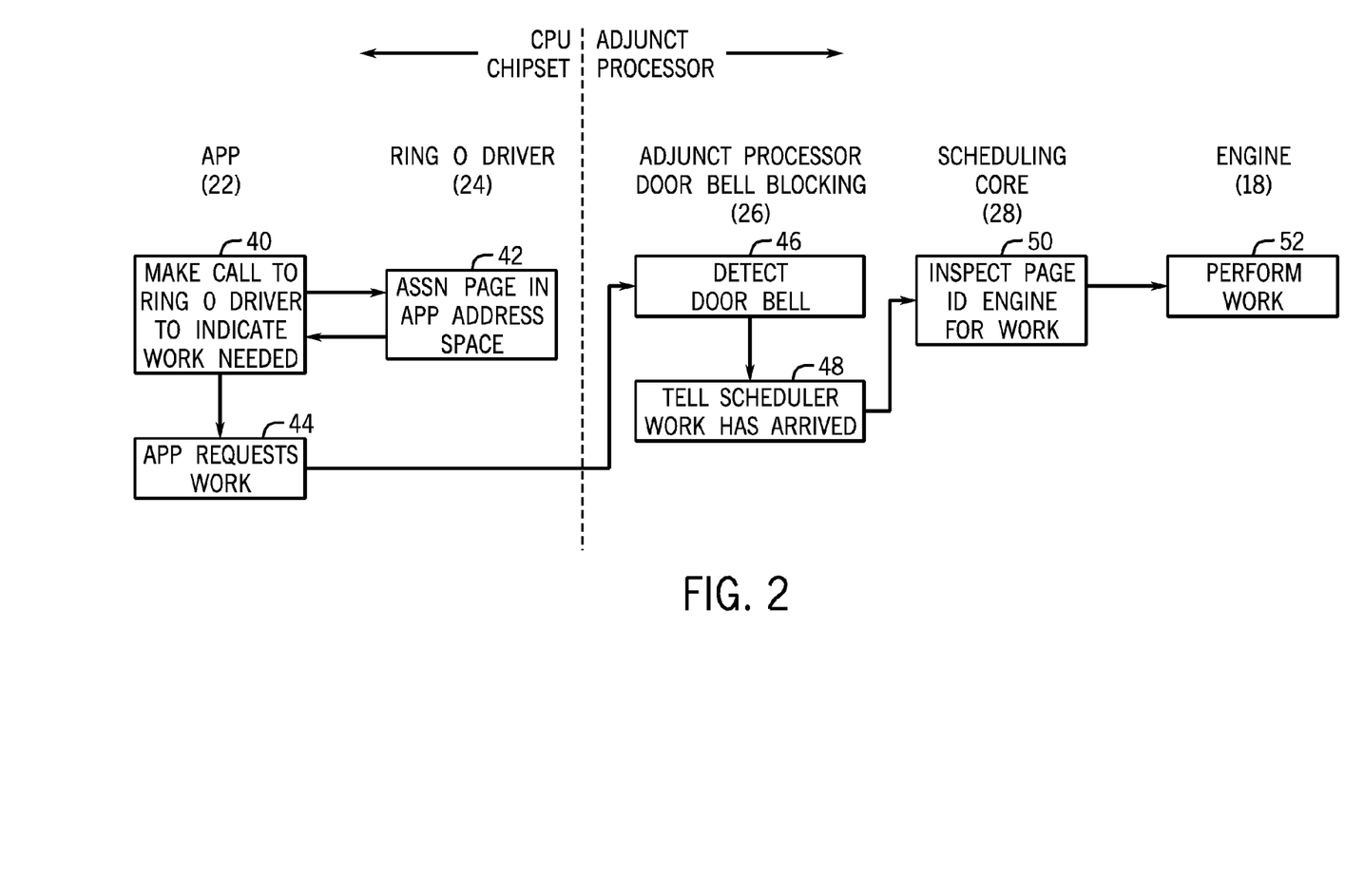
FIG. 2 is a system flow chart from one embodiment of the present invention.

Referring to FIG. 2, the overall sequence is divided into a part, on the left, done by the central processing unit and/or chipset and a part, on the right, that is done by adjunct processor resources. The flow begins with the application 22 making a call to a ring 0 driver to indicate that it has a job that needs to be done in an adjunct processor as indicated in block 40. In particular the application requests work, as indicated in block 44. Then the flow goes to the adjunct processor doorbell block registers 26 which detect any rung doorbells in the pre-assigned page for the application, as indicated in block 46.

Block registers 26 tell the scheduling core that work has arrived as indicated in block 48. The scheduling core 28 then inspects the page and identifies the engine that needs to do the work, as indicated in block 50. Next, the scheduling core 28 passes the job on to the engine 18 to perform the work as indicated in block 52. Of course this assumes that the application is already registered.

Figure 3:
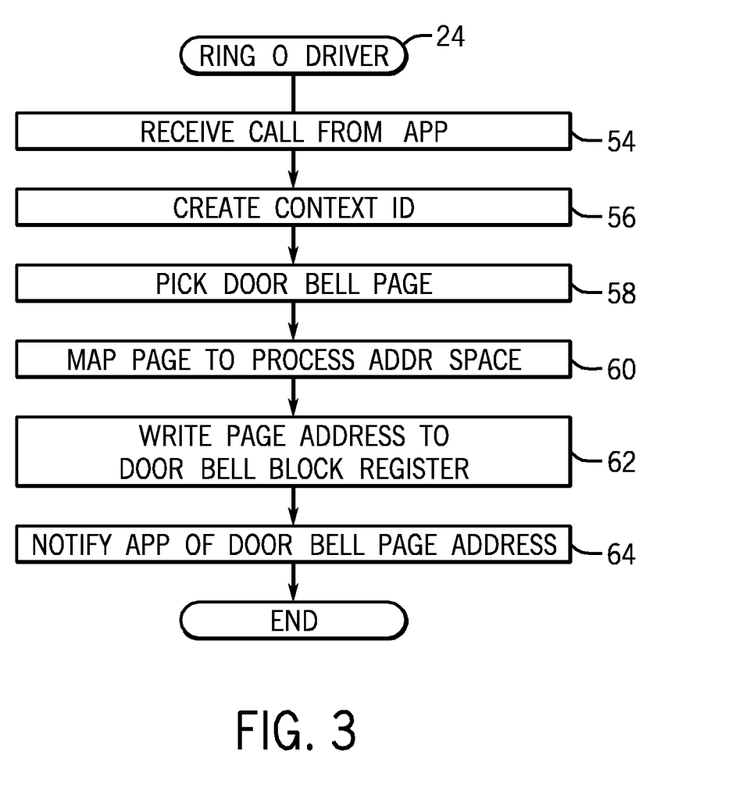
FIG. 3 is a flow chart for the ring 0 driver in accordance with one embodiment of the present invention.

FIG. 3 illustrates a sequence for a ring 0 driver 24. Generally this sequence is implemented in software or firmware but it could also be implemented in hardware. In software and firmware embodiments it may be implemented by computer-executed instructions stored in a non-transitory computer-readable medium such as a magnetic, semiconductor or optical storage.

The ring 0 driver 24 sequence begins by receiving a call from an application as indicated in block 54. A context identifier (or process identifier) is created in block 56. Then a doorbell page is selected as indicated in block 58. That page is mapped to the process address space in block 60.

Thereafter, the page address is written to the doorbell block registers as indicated in block 62. The application is notified of the doorbell page address as indicated in block 64.

Figure 4:
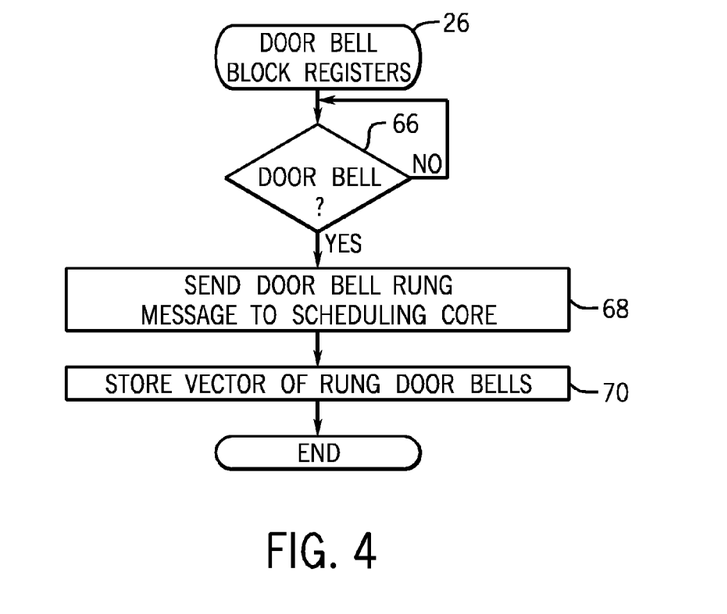
FIG. 4 is a flow chart for the doorbell block registers according with one embodiment of the present invention.

The sequence of operation of the doorbell block registers 26 is indicated in FIG. 4. This sequence may be implemented in software, firmware and/or hardware. In software and firmware embodiments it may be implemented by computer-executed instructions stored in a non-transitory computer-readable medium such as an optical, magnetic or semiconductor storage.

In some embodiments, the sequence begins upon detecting the ringing of a doorbell as indicated in diamond 66. Then the doorbell rang message is sent to the scheduling core as indicated in block 68. The registers store the vector of the rung doorbells as indicated in block 70, so that this information is available to the scheduling core.

Figure 5:
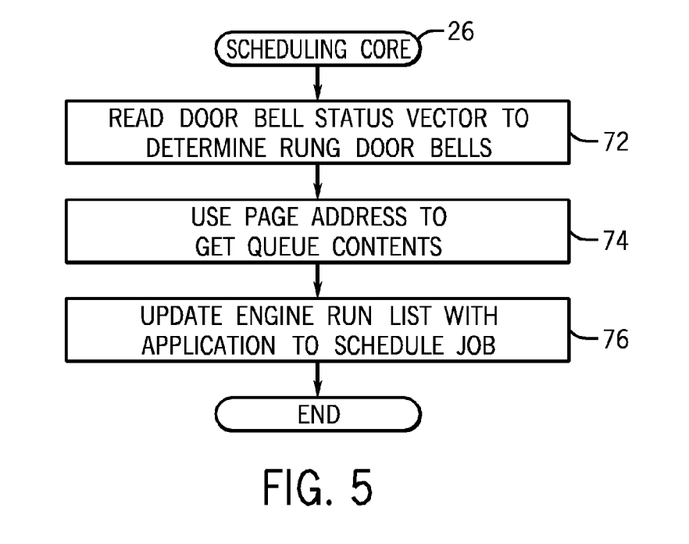
FIG. 5 is a flow chart for the adjunct processor scheduling core according to one embodiment of the present invention.

Moving to the operation of the scheduling core 28, shown in FIG. 5 according to one embodiment, the sequence may be implemented in software, firmware and/or hardware. In software and firmware embodiments it may be implemented by computer-executable instructions stored in a non-transitory computer-readable medium such as a magnetic, semiconductor or optical storage.

In one embodiment the sequence begins as indicated in block 72 by reading the doorbell status vector to determine which doorbells have been rung. Then the page address is used to get the queued contents as indicated in block 74. Finally the engine, that is the subject of the application request, has its rung list updated to schedule the job.

Figure 6:
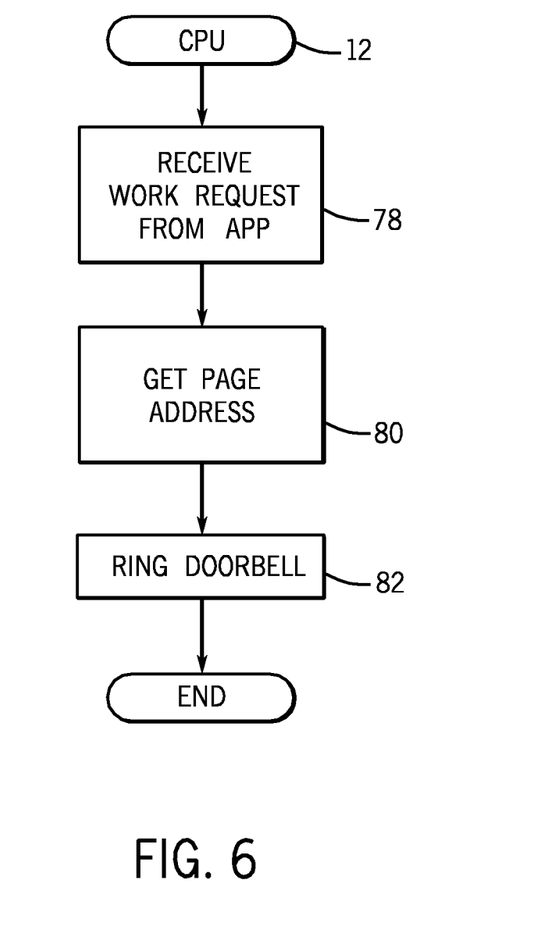
FIG. 6 is a flow chart for an application in one embodiment.

Finally, turning to FIG. 6, a sequence, implemented for example by the central processing unit 12, may be implemented in hardware, software and/or firmware. In software and firmware embodiments it may be implemented by computer-executed instructions stored in a non-transitory computer-readable medium such as a magnetic, optical or semiconductor storage.

In one embodiment, the sequence begins with initialization as indicated in block 78. Then a doorbell allocation is requested as indicated in block 80. The page address for the doorbell is obtained as indicated in block 82. Next a workload is created as indicated in block 84. Finally, the doorbell is rung as indicated by the arrow labelled door bell write in FIG. 1.

The doorbells may be implemented in different ways. In one embodiment the doorbells may be implemented in the write back space. The ring 0 driver and the application agree on the memory page to be used in the write back space. The use of the write back space may be advantageous because some operating systems prefer to use the write back space compared to other cacheable memory locations including uncacheable space, or write combining space.

The application then operates through the user mode driver, that attaches to the application, down through a chain to eventually arrive at the ring 0 driver. The write back space is a system memory location. When the application asks for a page, the application in effect asks for a write back page and the operating system grants it. Then the ring 0 driver picks a cache line password to monitor in order to determine when a bell has been rung. It also informs the registers 26 as well as the application of the particular cache line being monitored.

The register block 26 monitor the chosen cache line to determine if there is a write to that cache line. For each doorbell page, the ring 0 driver allocates backing pages with write back attributes. When a write back page is used as a doorbell page, the hardware monitors only a piece of the doorbell page and in some embodiments that piece is a four kilobyte piece as opposed to the whole page.

The selection of a cacheline (64 bytes) to monitor in one embodiment is done by the ring 0 driver. The ring 0 driver may use an algorithm to select different locations in different pages so that the ways in the cache do not become oversubscribed. Sixty-four bytes is a cache line and it tells the application which line will be monitored. In some embodiments the selected page must be a pinned page and the cache line is selected based on an algorithm to prevent oversubscription.

In other embodiments, the doorbells may be selected in the adjunct processor's virtual address space aperture window. Here the ring 0 driver can specify a given range (or 4 sub-ranges) as the doorbell range. The doorbell range generally falls within the aperture of the adjunct processor. Then the system agent or chipset monitors writes to the first cache line of each page that constitutes the doorbell range. The ring 0 driver can selectively enable monitoring of each of the 256 available doorbells, using a memory-mapped input/output (MMIO) register in some embodiments.

For each doorbell page, the ring 0 driver allocates backing pages with uncacheable attributes. Each doorbell page may be pinned in some embodiments. The first cache line is the doorbell address that the system agent monitors. It contains the work queue tail pointer. The page cannot be write-combining since this may cause the first cache line write to happen before the queue contents update, due to reordering. The second cache line contains the head pointer of the queue. The remaining cache lines may contain the workload in the form of pointers to the batch buffers.

The techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
enabling processor having a ring 3 to ring 0 resource to be used by an application running on a central processing unit repeatedly using only one transition of the central processing unit from ring 3, wherein a ring 3 to ring 0 resource is a resource that requires a transition from ring 3 to ring 0; and
avoiding a transition from ring 3 to ring 0 when the processor's ring 3 to ring 0 resource is used repeatedly by the central processing unit;
enabling the application to register to use an adjunct processor that is a ring 3 to ring 0 resource;
registering the application using a ring 3 to ring 0 transition and then enabling the application to use that resource thereafter without another ring 3 to ring 0 transition.

2. The method of claim 1 including establishing a region in virtual memory to indicate when an application wants to use the resource.

3. The method of claim 2 including enabling the adjunct processor to detect a write to that region.

4. The method of claim 3 including enabling the adjunct processor to schedule a job in response to detecting the write.

5. The method of claim 2 including mapping the adjunct processor to said region using a process address space.

6. The method of claim 2 including establishing said region as a write back page.

7. The method of claim 6 including assigning a line of said page and monitoring said line for a write including a request for an adjunct processor resource.

8. The method of claim 1 including providing a ring 0 driver to set up an identifier to identify said application.

9. A non-transitory computer readable medium storing instructions to enable a processor to:
enable processor having a ring 3 to ring 0 resource to be used by an application running on a central processing unit repeatedly using only one transition of the central processing unit from ring 3, wherein a ring 3 to ring 0 resource is a resource that requires a transition from ring 3 to ring 0; and
avoid a transition from ring 3 to ring 0 when the processor's ring 3 to ring 0 resource is used repeatedly by the central processing unit;
storing instructions to enable the application to register to use an adjunct processor that is a ring 3 to ring 0 resource;
storing instructions to register the application using a ring 3 to ring 0 transition and then enable the application to use that resource thereafter without another ring 3 to ring 0 transition.

10. The medium of claim 9 further storing instructions to establish a region in virtual memory to indicate when an application wants to use the resource.

11. The medium of claim 10 further storing instructions to enable the adjunct processor to detect a write to that region.

12. The medium of claim 11 further storing instructions to enable the adjunct processor to schedule a job in response to detecting the write.

13. The medium of claim 10 further storing instructions to map the adjunct processor to said region using a process address space.

14. The medium of claim 10 further storing instructions to establish said region as a write back page.

15. The medium of claim 14 further storing instructions to assign a line of said page and monitor said line for a write including a request for an adjunct processor resource.

16. The medium of claim 9 further storing instructions to provide a ring 0 driver to set up an identifier to identify said application.

17. An apparatus comprising:
   a processor having a resource, and a central processing unit, coupled to said processor, said unit to enable an application running on the central processing unit to be used by an adjunct processor resource repeatedly using only one transition of the central processing unit from ring 3, wherein a ring 3 to ring 0 resource is a resource that requires a transition from ring 3 to ring 0, and avoid a transition from ring 3 to ring 0 when the processor's ring 3 to ring 0 resource is used repeatedly by the central processing unit;
   said unit to enable the application to register to use the adjunct processor that is a ring 3 to ring 0 resource; said unit to register the application using a ring 3 to ring 0 transition and then enable the application to use that resource thereafter without another ring 3 to ring 0 transition.

18. The apparatus of claim 17, said unit to establish a region in virtual memory to indicate when an application wants to use the resource.

19. The apparatus of claim 18, the adjunct processor to detect a write to that region.

20. The apparatus of claim 19, the adjunct processor to schedule a job in response to detecting the write.

21. The apparatus of claim 17 including a ring 0 driver executed by said unit to set up an identifier to identify said application.

22. The apparatus of claim 18, the adjunct processor to map to said region using a process address space.

23. The apparatus of claim 18, said unit to establish said region as a write back page.

24. The apparatus of claim 23, said unit to assign a line of said page and monitor said line for a write including a request for an adjunct processor resource.

\* \* \* \* \*